United States Patent [19]

Van De Kerkhof

[11] Patent Number: 5,687,282
[45] Date of Patent: Nov. 11, 1997

[54] METHOD AND APPARATUS FOR DETERMINING A MASKED THRESHOLD

[75] Inventor: Leon M. Van De Kerkhof, Eindhoven, Netherlands

[73] Assignee: U.S. Philips Corporation, New York, N.Y.

[21] Appl. No.: 585,009

[22] Filed: Jan. 11, 1996

[30] Foreign Application Priority Data

Jan. 9, 1995 [EP] European Pat. Off. .............. 95200031

[51] Int. Cl.$^6$ ...................................................... G10L 3/02
[52] U.S. Cl. ............................................ 395/2.14; 395/2.12
[58] Field of Search ........................... 395/2.12, 2.14, 395/2.15, 2.09

[56] References Cited

U.S. PATENT DOCUMENTS

| | | | |
|---|---|---|---|
| 5,274,711 | 12/1993 | Rutledge et al. | 395/2.12 |
| 5,365,553 | 11/1994 | Veldhuis et al. | 375/122 |
| 5,367,608 | 11/1994 | Veldhuis et al. | 395/2.38 |
| 5,544,247 | 8/1996 | Kate | 395/2.12 |

OTHER PUBLICATIONS

Veldhuis et al., "Subband Coding of Digital Audio Signals", Philips J. Res., 44, pp. 329–343, 1989.

*Primary Examiner*—Kee M. Tung
*Attorney, Agent, or Firm*—Michael E. Marion

[57] ABSTRACT

A method and apparatus is disclosed for determining a masked threshold curve as a function of frequency from an information signal. The method includes (a) a first step of determining for each frequency value a first masking component MC(1,k) at the frequency value f(k) resulting from a frequency component at the frequency value and having a magnitude equal to the magnitude value PV(k) of the magnitude spectrum at the frequency value, (b) a second step of determining for subsequent frequency values when going in one direction through the frequency range of interest a second masking component MC(2,k) at a frequency value, the second masking component for the frequency value being determined from the first masking component MC(1,k−1) and a second masking component MC(2,k−1) at only the frequency value directly preceding the frequency value f(k−1), (c) a third step of determining for subsequent frequency values when going in the reverse direction through the frequency range of interest a third masking component MC(3,k) at a frequency value, the third masking component for the frequency value being determined from masking information that has a relation to at least the first masking component MC(1,k+1) and the third masking component MC(3,k+1) at only the frequency value f(k+1) directly preceding the frequency value, and (d) a fourth step for determining a masking value MV(k) for a frequency value in the masked threshold curve from masking information that has a relation to the first, second and third masking components (if present) for the frequency value.

18 Claims, 4 Drawing Sheets

METHOD AND APPARATUS FOR DETERMINING A MASKED THRESHOLD

BACKGROUND OF THE INVENTION

The invention relates to a method of determining a masked threshold curve as a function of frequency from a magnitude spectrum as a function of frequency, the magnitude spectrum being in the form of magnitude values for a number of subsequent frequency values in a frequency range of interest, as well as to an apparatus for carrying out the method.

Such method and apparatus are known from European patent applications EP 457,390-A1 and EP 457,391-A1 , which correspond to U.S. Pat. Nos. 5,367,608 and 5,365, 553, respectively. Further, reference is made to the publication 'Subband coding of digital audio signals' by R. N. J. Veldhuis et al in Philips J. Res. Vol. 44, pp. 329–43, 1989.

The documents describe various ways of determining the masked threshold curve, or more shortly defined as the 'masked threshold', from a magnitude spectrum as a function of frequency. The method described in EP 457,390 and EP 457,391 makes use of a calculation using a matrix. Each coefficient d(m,i) in said matrix is a measure for the masking effect that the signal component in a subband i has on a signal present in a subband m. As a result, a large number of calculations need to be carried out in order to obtain said masked threshold as a function of subband number, and thus as a function of frequency.

SUMMARY OF THE INVENTION

The invention aims at simplifying the method and the corresponding apparatus. The method in accordance with the invention is characterized in that the method comprising a first step of determining for each frequency value a first masking component at said frequency value resulting from a frequency component at said frequency value and having a magnitude equal to the magnitude value of the magnitude spectrum at said frequency value, a second step of determining for subsequent frequency values when going in one direction through the frequency range of interest a second masking component at a frequency value, the second masking component for said frequency value being determined from the first masking component and the second masking component at only the frequency value directly preceding said frequency value, a third step of determining for subsequent frequency values when going in the reverse direction through the frequency range of interest a third masking component at a frequency value, the third masking component for said frequency value being determined from masking information that has a relation to at least the first masking component and the third masking component at only the frequency value directly preceding said frequency value, a fourth step for determining a masked value for a frequency value in said masked threshold curve from masking information that has a relation to said first, second and third masking components (if present) for said frequency value.

The invention is based on the recognition to calculate in a first step a masking component corresponding to the in-band masking, and in a second and a third step to calculate the masking effects on other frequency components by going twice through the frequency range of interest, once in the one direction and the second time in the reverse direction, and each time calculating the (second or third) masking components for a frequency value from masked information that has a relation to masking components obtained in a previous step for its previous frequency value. The calculations carried out in the first step so as to derive the first masking components relate to the calculations carried out in the known method on the diagonal coefficients d(m,m) in the matrix. The calculations carried out in the second step so as to derive the second masking components relate to the calculations carried out in the known method on the coefficients d(m,m−1), or d(m−1,m), in the matrix. The calculations carried out in the third step so as to derive the third masking components relate to the calculations carried out in the known method on the coefficients d(m−1,m), or d(m, m−1), in the matrix. Thus less calculations need to be carried out resulting in a simplified method and apparatus.

The sub claims define various ways of deriving the second and third masking components in the second and third step respectively and the masked threshold in the fourth step.

BRIEF DESCRIPTION OF THE DRAWINGS

These and other aspects of the invention will be further explained in the following figure description, in which.

DESCRIPTION OF THE PREFERRED DRAWINGS

Figure 1:
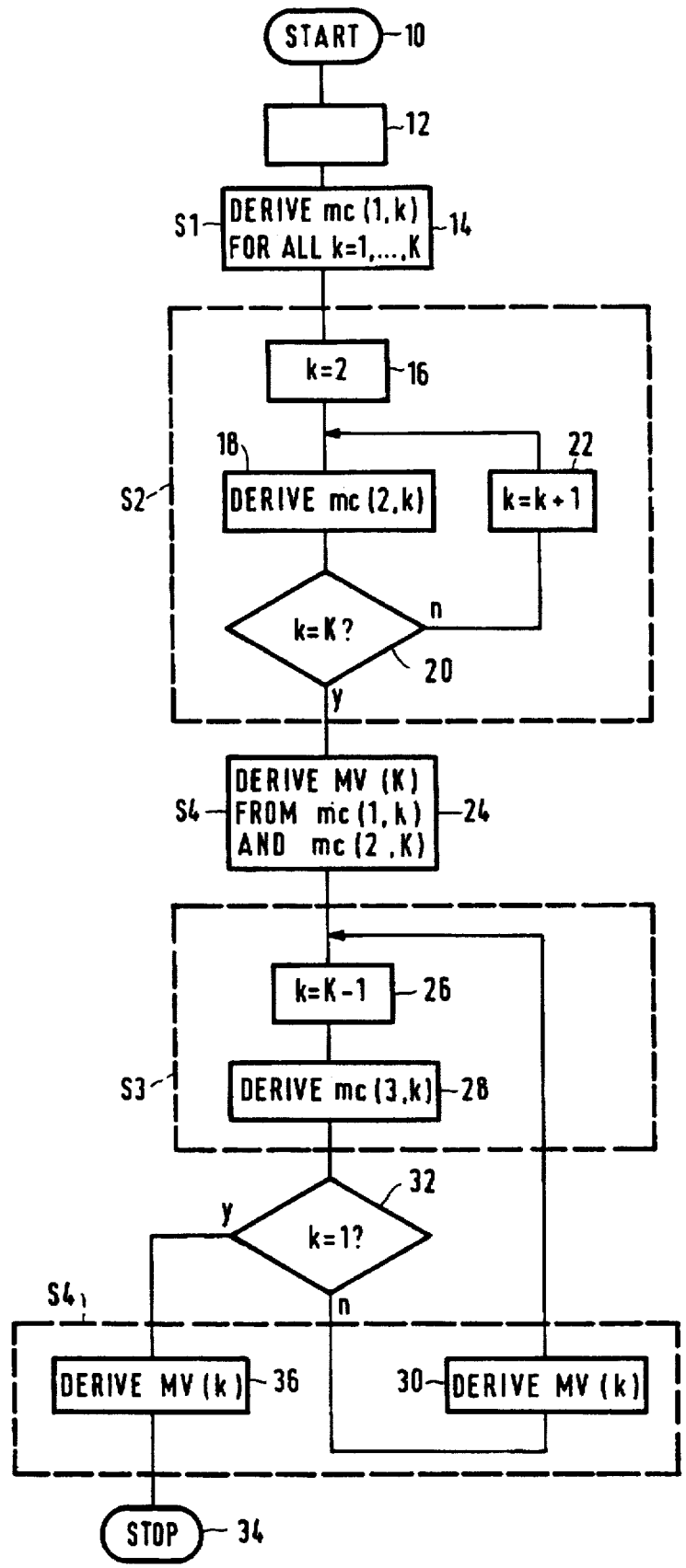
FIG. 1 shows an embodiment of the method.

FIG. 1 shows a flow diagram of an embodiment of the method. The method starts in block 10. First a time-to-frequency conversion is carried out on a signal block of an information signal, such as a digital audio signal. This conversion can be a Fast Fourier transform (FFT) and is carried out in block 12. Using the results of the Fourier transform, a magnitude spectrum as a function of frequency can be obtained, the magnitude spectrum being in the form of magnitude values PV(k) for a number of K subsequent frequency values f(k) in a frequency range of interest from f(1) to f(K).

Next, in a first step $S_1$, for each of the K frequency values f(k), a first masking component MC(1,k) at said frequency value is determined, see block 14. This first masking component at frequency value f(k) corresponds to the masking effect realized by a signal component at said frequency value f(k) and having a magnitude equal to the magnitude value PV(k) of the magnitude spectrum at said frequency value f(k). In the literature, this masking component is identified as the 'in-band' masking component.

In a second step, k is set to the value 2, see block 16. Next, in block 18, a second masking component MC(2,k) is derived for the frequency value f(k) from the first and the second masking components at the frequency value f(k−1), that is at the directly preceding frequency value. This derivation is repeated for subsequent frequency values, see the blocks 20 and 22.

It will be clear that in the second step, one goes from the lower boundary of the frequency range of interest to the higher boundary of the frequency range so as to derive the second masking components from the first and the second masking components for a preceding (next lower) frequency value.

Figures 3A, 3B:
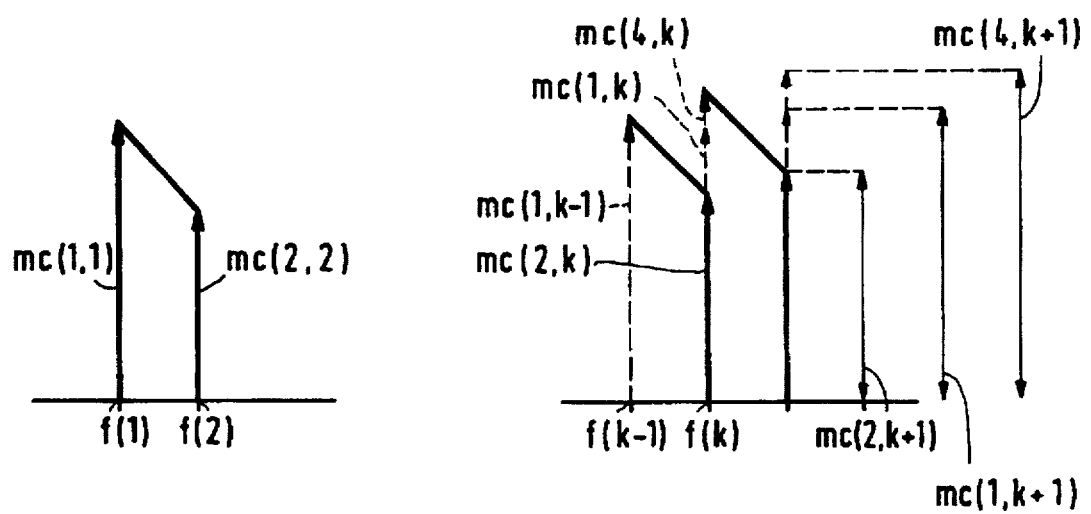
FIGS. 3a and 3b show the derivation of the second masking components.

It will further be clear that, as no lower frequency value than f(1) is present, no second masking component has been derived for this frequency value. The second masking component MC(2,2) for f(2) is thus derived from the first masking component MC(1,1) for f(1) only. This derivation is shown in FIG. 3a. As an example, the second masking component MC(2,2) is derived from the masking component MC(1,1) by subtracting a subtraction value from the masking component MC(1,1).

FIG. 3b shows how the second masking components MC(2,k) for the other frequency values can be obtained. A further explanation will be given below.

Next, the masked threshold for the highest frequency value f(I) can now already be derived by combining the first and second masking components MC(1,K) and MC(2,K), see block 24. This for the reason that no higher frequency value than f(K) is present, so that no third masking component, see below, has been derived for this frequency value.

In a third step, the variable k is decreased by one, see block 26. Now, for the next lower frequency f(k) a third masking component MC(3,k) is derived from at least the first and the third masking components at the frequency value f(k+1), see block 28. This derivation is repeated for subsequent frequency values, see the blocks 30 and 32.

The third masking component MC(3,k) at the frequency value f(k) may also be derived from a combination of the first, second and third masking components MC(1,i+1), MC(2,i+1) and MC3,i+1) at the frequency value f(i+1). The derivation of the third masking components will be explained below with reference to FIGS. 4a and 4b.

It will be clear that in the third step, one goes from the higher boundary of the frequency range of interest to the lower boundary of the frequency range so as to derive the third masking components from the masking components for a preceding (next higher) frequency value.

Further, the masked threshold values MV(k) for the frequency values f(2) to f(K−1) can be derived from the first, second and third masking components MC(1,k), MC(2,k) and MC(3,k), see the block 30.

When k is equal to 1, see block 32, the program continues via the block 36. In this block the masked threshold value MV(1) is derived from MC(1,1) and MC(3,1), as no MC(2, 1) is available.

Next, the program is terminated, see block 34, or can be repeated, starting with the block 12 for a new signal block of the information signal, that may partly overlap the first mentioned signal block.

As can be seen from FIG. 1, the derivation of the masked threshold values MV(k) is realized by the blocks 24, 30 and 36. Those blocks could be identified as being a fourth step in the method to determine the masked threshold. This fourth step thus not necessarily need to follow the third step after this third step has been terminated. The derivation of the masked threshold may thus be interleaved earlier in the sequence of activities, namely when all the information for deriving the masked threshold for a specific frequency is available. This has the advantage that less information need to be stored in an intermediate storage register.

It is further clear that, in order to derive the second masking component MC(2,k) in the step $S_2$, the first masking component MC(1,k−1) must be available. Therefore, a memory must be available so as to store first masking components obtained in the step $S_1$ at least temporarily. Further, in the situation where the third masking component MC(3,k) in the step $S_3$ is derived from a combination of MC(1,k+1) and MC(3,k+1), it will be necessary to keep the values for MC(1,k+1) and MC(3,k+1) stored at least until said third masking components have been derived.

However, in the situation where the third masking component MC(3,k) in the step $S_3$ is derived from a combination of MC(1,k+1), MC(2,k+1) and MC(3,k+1), one could additionally calculate in the step $S_2$ a fourth masking component MC(4,k) which is the combination of MC(1,k) and MC(2,k) and store this masking component MC(4,k) instead of MC(1,k) and use the fourth masking component MC(4,k+1) and the third masking component MC(3,k+1) to derive the third masking component MC(3,i) in the third step $S_3$. Further, the various derivations in the third step may be interleaved with derivations in the second step.

Figure 2:
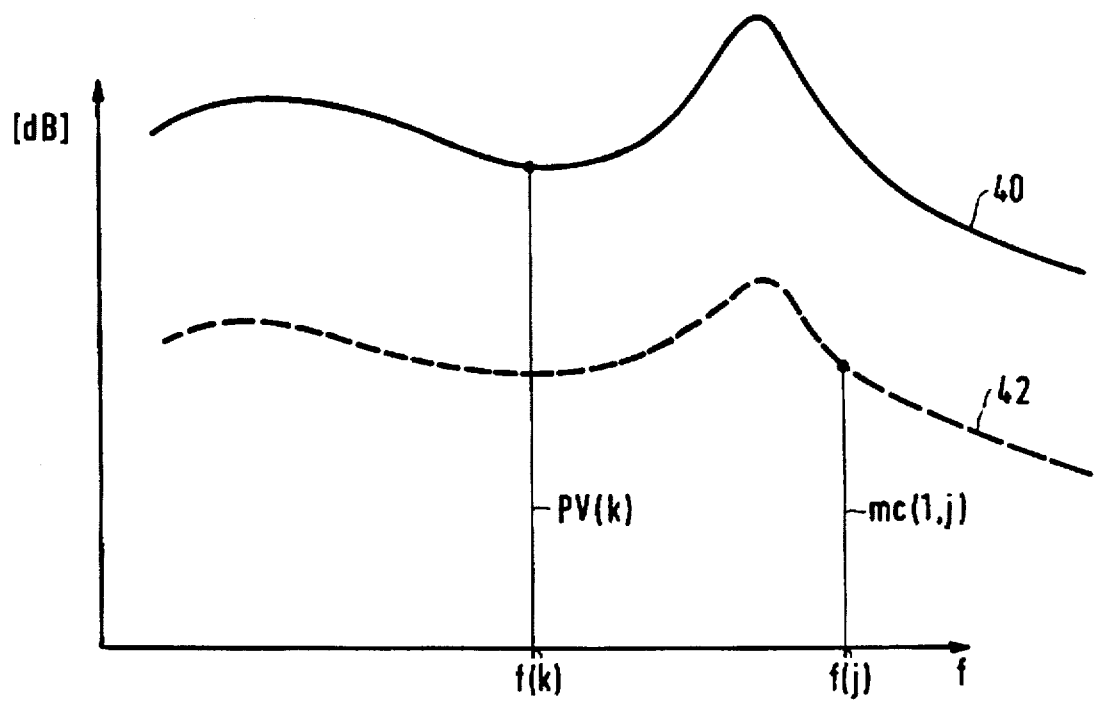
FIG. 2 shows a frequency spectrum of the information signal from which the masking curve is derived and the first masking components.

FIG. 2 shows by the curve 40 the result of the time-to-frequency conversion carried out in the block 12. This curve 40 may represent the power of the information signal and is plotted along a dB scale as a function of frequency. The curve comprises magnitude values PV(k) for subsequent frequencies f(k) in a frequency range of interest, e.g. between f=0 and 20 kHz. The FFT carried out in the block 12 results in complex coefficients that can be used to obtain magnitude values PV(k) for equi-distant frequency values f(k). FIG. 2 shows a second curve, indicated by the reference numeral 42. This curve 42 represents the first masking components MC(1,k) for the frequency values f(k). One such first masking component MC(1,j) is shown. This curve, formed by the K first masking components MC(1,0) to MC(1,K), is obtained in the first step $S_1$. A first masking component MC(1,k) can be obtained from the magnitude value PV(1,k) by subtracting a predetermined dB value from PV(1,k). This predetermined dB value may be a constant value, or may be frequency dependent, that is: dependent of k.

The FIGS. 3a and 3b show how the second masking component can be derived. FIG. 3a shows the derivation of the second masking component MC(2,2) from the first masking component MC(1,1), which derivation has been discussed earlier. FIG. 3b shows the derivation of the second masking components for the other frequency values k. FIG. 3b shows the first masking components MC(1,k−1), MC(1, k) and MC(1,k+1) for three subsequent frequencies f(k−1), f(k) and f(k+1) respectively. The second masking component for a frequency f(k) is derived from a combination of the first masking component MC(1,k−1) and the second masking component MC(2,k−1) of the preceding frequency value f(k−1). As a consequence, assuming that the second masking component MC(2,k) is known. Now a fourth masking component MC(4,k) is calculated by combining the masking components MC(1,k) and MC(2,k). Next, the second masking component MC(2,i+k) can be obtained from MC(4,k), e.g. again by subtracting a subtraction (dB) value from MC(4,k).

The combination of the first and second masking components for a frequency f(k) so as to obtain the fourth masking component MC(4,k), can be realized by summing the two components on a linear basis. As the components in FIG. 3b are plotted on a dB scale, the fourth masking component is only slightly larger than the larger one of the first and second masking components.

Figure 4A:
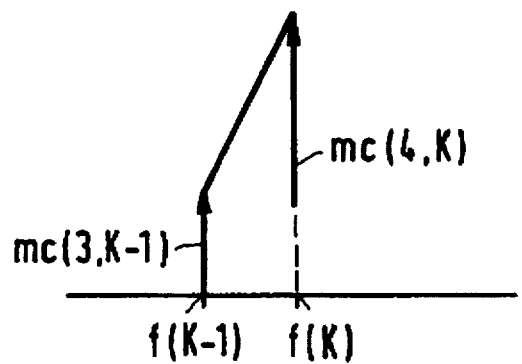
FIGS. 4a and 4b show the derivation of the third masking components.
Figure 4B:
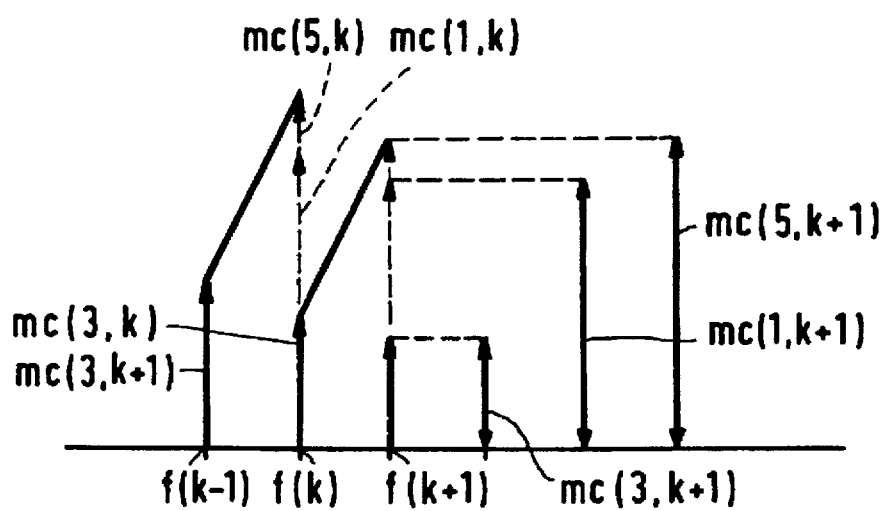

FIG. 4a shows how the third masking component for the frequency f(K−1) is derived, namely by subtracting a subtraction value (in dB) from the fourth masking component MC(4,K). The subtraction value for deriving the third masking component will generally be larger than the subtraction value for deriving the second masking component. It should be noted here, that the third masking component MC(3,K−1) could have been derived from the first masking component MC(1,K) alone. FIG. 4b shows how the third masking components for the other frequency values can be derived. FIG. 4b shows the first masking components MC(1,k) and MC(1,k+1) for two subsequent frequencies f(k) and f(k+1) respectively. Further, the third masking component MC(3, k+1) for the frequency f(k+1) is shown. In FIG. 4b, the third masking component MC(3,k) for a frequency f(k) is derived from a combination of the first masking component MC(1, k+1) and the third masking component MC(3,k+1) of the preceding frequency value f(i+1). Now a fifth masking component MC(5,k+1) is calculated by combining the masking components MC(1,k+1) and MC(3,k+1). Next, the third masking component MC(3,k) can be obtained from MC(5,k+1), resulting in a third masking component MC(3, k). Combining the masking components MC(1,k+1) and MC(3,k+1) so as to obtain MC(5,k+1), can again be realized on a linear or a logarithmic basis. The derivation of the third masking component MC(3,k) can again be realized by subtracting a subtraction value from MC(5,k+1).

Further, as for the highest frequency in the frequency range of interest there is no further higher neighbouring frequency, it is not possible to derive a third masking component for that frequency.

The mathematics of deriving the second masking components and the third masking components is based on the well known theory of masking, as can be found in the literature. Reference is made in this respect to document (3) in the list of references. More specifically, paragraph 4 and FIG. 5 in the document. In this figure, a curve is given, indicating the masking effect of a signal component of a certain normalized frequency f=1, on signal components being present at neighbouring lower and higher frequencies. As can be seen in the figure, this masking effect is shown by two lines. A first line that decays for increasing frequencies above the normalized frequency f=1 and a second line that decays for decreasing frequencies below the normalized frequency. The slope of the second line is steeper than the slope for the first line in the figure. This figure can thus be used as a basis for the derivation of the second and third masking components. More specifically, the first line in that figure can be used to derive the second masking components in the second step. This is indicated in FIGS. 3a and 3b, where the lines interconnecting the tops of each time two arrows for two subsequent frequencies, such as the two arrows MC(1,1) and MC(2,2) in FIG. 3a, are equivalent to the first line from FIG. 5 of the above-identified Veldhuis article.

Further, the second line in that figure can be used to derive the third masking components in the third step. This is indicated in FIGS. 4a and 4b, where the lines interconnecting the tops of each time two arrows for two subsequent frequencies, such as the two arrows MC(2,K) and MC(3, K−1) in FIG. 4a, are equivalent to the second line from FIG. 5 of the above-identified Veldhuis article.

Figure 5:
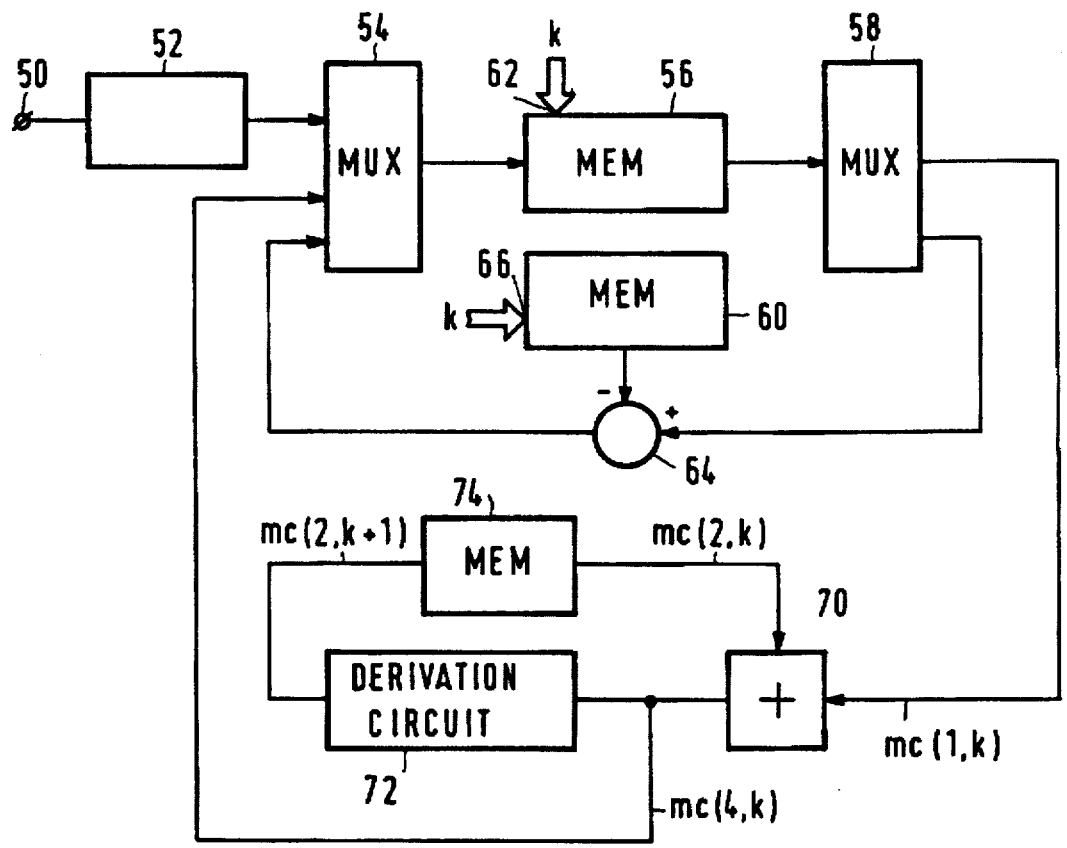
FIG. 5 shows an embodiment of the apparatus, and FIG. 6 a part of the apparatus of FIG. 5, when carrying out the third step of the method.

When comparing the slopes of the lines in the FIGS. 3a and 3b with the lines in the FIGS. 4a and 4b, it will be apparent that the slopes of the lines in the FIGS. 4a and 4b are steeper, which is in agreement with FIG. 5 of the above-identified Veldhuis article.

It should be noted that the third masking components could have been derived from a combination of the first, second and third masking components. This has not been further explained as such derivation speaks for itself after the explanation given above.

FIG. 5 shows an embodiment of an apparatus for carrying out the method. The apparatus comprises an input terminal 50 for receiving the information signal. The input terminal 50 is coupled to an input of a time-to-frequency converter 52, which carries out in the present example a Fast Fourier Transform on a signal block of the information signal and derives a power spectrum from the results of the Fourier transform. This results in the magnitude values PV(k) that are supplied to an input of a multiplexer 54. An output of the multiplexer 54 is coupled to an input of a memory 56, which has an output coupled to an input of a multiplexer 58.

The memory 56 is adapted to store the K magnitude values PV(k) in corresponding memory locations identified by addresses k supplied to an address input 62 of the memory 56. An output of the multiplexer 58 is coupled to an input of a subtractor circuit 64, which has a second input coupled to an output of a memory 60. An output of the subtractor circuit 64 is coupled to a second input of the multiplexer 54.

In the first step, the first masking components for the K frequency values f(k) are obtained, by subtracting a predetermined value from the magnitude PV(k). If the predetermined value is a constant, the memory 60 has only one storage location for storing the constant. It will however be assumed that the predetermined value is not constant, but dependent of frequency. As a result, the memory 60 has K storage locations for storing the K predetermined values, one for each of the K frequency values. Consequently, the memory 60 requires an address input 66 for addressing the K storage locations.

A second output of the multiplexer 58 is coupled to a first input of a combination unit 70. An output of the combination unit 70 is coupled to an input of a derivation circuit 72, as well as to a third input of the multiplexer 54. An output of the derivation circuit 72 is coupled via a memory 74 to a second input of the combination unit 70.

The functioning of the apparatus of FIG. 5 will now be described.

In the first step, the K magnitude values are read out subsequently from the memory 56 under the influence of subsequent addresses to the input 62 and supplied via the multiplexer 58 to the subtractor circuit 64. Further, the memory 60 supplies subsequent predetermined values to the second input of the subtractor circuit 64 under the influence of addresses to the address input 66. The memory 60 supplies the predetermined value corresponding to the frequency value f(k) to the subtractor circuit 64 at the instant that the magnitude value PV(k) for that same frequency is supplied to the subtractor circuit 64 by the memory 56. As a result, the first masking component MC(1,k) is available at the output of the subtractor circuit 64, and is supplied to the input of the memory 56 via the multiplexer 54. This first masking component is subsequently stored in the memory 56 at the same storage location as where the magnitude PV(k) was stored originally. This process is repeated for all the frequency components.

In the second step, the derivation of the second masking components as described in the FIGS. 3a and 3b is carried out. The first masking component MC(1,1), stored in the first memory location in the memory 56, is supplied under the influence of the first address to the input 62 via the multiplexer 58 to the first input of a combination circuit 70. The memory 74 has a zero value stored in it. Thus, the first masking component MC(1,1) is supplied to the input of derivation circuit 72. The derivation circuit 72 is adapted to derive the second masking component at its output, in response to the masking component applied to its input. As a result, the second masking component MC(2,2) is obtained, which is stored in the memory 74. Next, the first masking component MC(1,2) is supplied to the first input of the combination circuit 70. At the output of the combination circuit 70 the fourth masking component MC(4,2) is available, which is supplied to the third input of the multiplexer 54 and stored in the memory 56 at the second storage location, thereby overwriting the first masking component MC(1,2) stored at that location. Moreover, the fourth masking component MC(4,2) results in the second masking component MC(2,3), which is stored in the memory 74.

Generally said: the first masking component MC(1,k) is supplied to the first input of the combination circuit 70. At the output of the combination circuit 70, the fourth masking component MC(4,k) is available, which is supplied to the third input of the multiplexer 54 and stored in the memory 56 at the k th storage location, thereby overwriting the first masking component MC(1,k) stored at that location. Moreover, the fourth masking component MC(4,k) results in the second masking component MC(2,k+1), which is stored in the memory 74.

Figure 6:
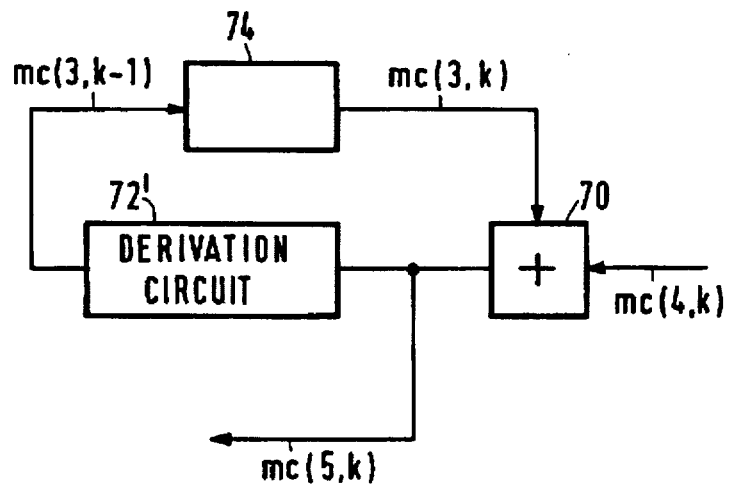

In the third step, the derivation of the third masking component as described in the FIGS. 4a and 4b is carried out. The circuit elements 70, 72 and 74 can be used for this purpose as well. Before starting the third step, the memory 74 need to be set to zero. Further, the derivation circuit 72 should be re-initialized so that it is capable of deriving the third masking components. The functioning of the apparatus in the third step will now further be described using FIG. 6, which shows only the elements mentioned above, where the derivation circuit now has the reference numeral 72', indicating that the derivation circuit now functions in another mode.

The fourth masking component MC(4,K), stored in the last memory location in the memory 56, is supplied under the influence of the address K to the input 62 via the multiplexer 58 to the first input of the combination circuit 70. As the memory 74 has a zero value stored in it, the fourth masking component MC(4,K) is supplied to the input of derivation circuit 72'. The derivation circuit 72' is adapted to derive the third masking component at its output, in response to the masking component applied to its input. As a result, the third masking component MC(3,K−1) is obtained, which is stored in the memory 74. Next, the fourth masking component MC(4,K−1) is supplied to the first input of the combination circuit 70. In the combination circuit 70, the masking components MC(3,K−1) and MC(4,K−1) are combined resulting in the fifth masking component MC(5,K−1) being available at its output. MC(5,K−1) is supplied to the third input of the multiplexer 54 and stored in the memory 56 at the last but one storage location, thereby overwriting the fourth masking component MC(4,K−1) stored at that location. Moreover, the fifth masking component MC(5,K−1) results in the third masking component MC(3,K−2), which is stored in the memory 74.

Generally said: the fourth masking component MC(4,k) is supplied to the first input of the combination circuit 70. At the output of the combination circuit the fifth masking component MC(5,k) is available, which is supplied to the third input of the multiplexer 54 and stored in the memory 56 at the k th storage location, thereby overwriting the fourth masking component MC(4,k) stored at that location. Moreover, the fifth masking component MC(5,k) results in the third masking component MC(3,k−1), which is stored in the memory 74.

After having terminated the third step, the memory 56 comprises the fifth masking components. Those masking components have been derived by effectively combining the first, second and third masking components. Thus, the memory 56 now comprises the masked threshold curve for the information signal applied to its input. In the present embodiment, the fourth step has thus been included in the second and third steps in order to obtain the masked threshold.

We claim:

1. Method of determining a masked threshold curve as a function of frequency from a magnitude spectrum as a function of frequency, the magnitude spectrum being in the form of magnitude values for a number of subsequent frequency values in a frequency range of interest, the method comprising a first step of determining for each frequency value a first masking component at said frequency value resulting from a frequency component at said frequency value and having a magnitude equal to the magnitude value of the magnitude spectrum at said frequency value, a second step of determining for subsequent frequency values when going in one direction through the frequency range of interest a second masking component at a frequency value, the second masking component for said frequency value being determined from the first masking component and the second masking component at only the frequency value directly preceding said frequency value, a third step of determining for subsequent frequency values when going in the reverse direction through the frequency range of interest a third masking component at a frequency value, the third masking component for said frequency value being determined from masking information that has a relation to at least the first masking component and the third masking component at only the frequency value directly preceding said frequency value, a fourth step for determining a masked value for a frequency value in said masked threshold curve from masking information that has a relation to said first, second and third masking components (if present) for said frequency value.

2. The method as claimed in claim 1, characterized in that a fourth masking component is derived for a frequency value from a combination of the first masking component and the second masking component at said frequency value, and that in said second step the second masking component at said frequency value is derived from the fourth masking component at said preceding frequency value.

3. The method as claimed in claim 2, characterized in that in the third step the third masking component at said frequency value is derived from said fourth masking component and said third masking component at said preceding frequency value.

4. The method as claimed in claim 1, characterized in that in the third step the third masking component at said frequency is derived from said first, second and third masking components at said preceding frequency.

5. The method as claimed in claim 1, characterized in that in the fourth step the masked value at said frequency is derived from said first, second and third masking components at said frequency.

6. Apparatus for determining a masked threshold curve as a function of frequency from a magnitude spectrum as a function of frequency, the magnitude spectrum being in the form of magnitude values for a number of subsequent frequency values in a frequency range of interest, the apparatus comprising a terminal for receiving said magnitude values for said number of subsequent frequency values, first means for determining for each frequency value a first masking component at said frequency value resulting from a frequency component at said frequency value and having a magnitude equal to the magnitude value of the magnitude spectrum at said frequency value, second means for determining for subsequent frequency values when going in one direction through the frequency range of interest a second masking component at a frequency value, the second masking component for said frequency value being determined from the first masking component and the second masking component at only the frequency value directly preceding said frequency value, said second means comprising memory means for storing at least one masking component for each of the frequency values, third means for determining for subsequent frequency values when going in the reverse direction through the frequency range of interest a third masking component at a frequency value, the third masking component for said frequency value being determined from masking information that has a relation to at least the first masking component and the third masking component at only the frequency value directly preceding said frequency value, fourth means for determining a masked value for each frequency value in said masked threshold curve from masking information that has a relation to said first, second and third masking components (if present) for said frequency value.

7. Apparatus as claimed in claim 6, characterized in that said first means comprise subtracting means for subtracting a subtraction value from the magnitude value at said frequency value so as to obtain the first masking component at said frequency value.

8. Apparatus as claimed in claim 7, characterized in that said subtraction value is frequency dependent.

9. Apparatus as claimed in claim 6, characterized in that said memory means are adapted to store the first masking components for each of the frequency values and the second masking components for at least a number of the frequency values.

10. Apparatus as claimed in claim 6, characterized in that said second means comprises combination means for combining the first and second masking components at said frequency so as to obtain a fourth masking component for said frequency, said memory means being adapted to store said fourth masking components.

11. Apparatus as claimed in claim 10, characterized in that said second means comprises derivation means for deriving the second masking component at said frequency value from the fourth masking component at said preceding frequency value.

12. Apparatus as claimed in claim 11, characterized in that said third means comprises derivation means for deriving said third masking component at said frequency value from said fourth masking component and said third masking component at said preceding frequency value.

13. Apparatus as claimed in claim 10, characterized in that said third means comprises derivation means for deriving said third masking component at said frequency value from said fourth masking component and said third masking component at said preceding frequency value.

14. Apparatus as claimed in claim 10, characterized in that said third means comprises combination means for combining said first and third masking component so as to obtain a fifth masking component, and derivation means for deriving said third masking component at said frequency value from said fifth masking component at said preceding frequency value.

15. Apparatus as claimed in claim 14, characterized in that said derivation means comprises subtracting means for subtracting a subtraction value from said fifth masking component so as to obtain said third masking component.

16. Apparatus as claimed in claim 15, characterized in that said subtraction value is frequency dependent.

17. Apparatus as claimed in claim 6, characterized in that the fourth means comprises adding means for adding said first, second and third masking components to each other.

18. Apparatus as claimed in claim 6, characterized in that it further comprises time-to-frequency conversion means, the said conversion means having an input for receiving an information signal as a function of time and an output for supplying said magnitude spectrum as a function of frequency in response to said information signal, the output of the conversion means being coupled to said terminal for receiving.

* * * * *